(12) United States Patent
Ishihara et al.

(10) Patent No.: US 6,840,472 B2
(45) Date of Patent: Jan. 11, 2005

(54) MAGNETIC TAPE CARTRIDGE

(75) Inventors: Yusuke Ishihara, Kanagawa-ken (JP);
Hideaki Shiga, Kanagawa-ken (JP);
Daisuke Takahashi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 233 days.

(21) Appl. No.: 10/058,076

(22) Filed: Jan. 29, 2002

(65) Prior Publication Data

US 2002/0109027 A1 Aug. 15, 2002

(30) Foreign Application Priority Data

Jan. 30, 2001 (JP) .......................................... 2001-020936

(51) Int. Cl.$^7$ ............................................. G11B 23/107
(52) U.S. Cl. ..................................... 242/332.4; 360/132
(58) Field of Search ........................... 242/332.4, 332.7, 242/348, 348.2, 348.3; 360/132

(56) References Cited

U.S. PATENT DOCUMENTS

| | | | | |
|---|---|---|---|---|
| 4,383,660 A | * | 5/1983 | Richard et al. | 242/348.2 |
| 5,465,187 A | * | 11/1995 | Hoge et al. | 360/132 |
| 6,236,539 B1 | * | 5/2001 | Morita et al. | 360/132 |
| 6,349,016 B1 | * | 2/2002 | Morita et al. | 360/132 |
| 6,505,789 B2 | * | 1/2003 | Ridl et al. | 242/348.2 |

FOREIGN PATENT DOCUMENTS

EP          0 924 703 A1      6/1999

* cited by examiner

Primary Examiner—William A. Rivera
(74) Attorney, Agent, or Firm—Sughrue Mion, PLLC

(57) ABSTRACT

A magnetic tape cartridge includes a cartridge case, a single tape reel, and a tape leader pin. The cartridge case has a tape leader opening in the side wall thereof. The tape reel with magnetic tape wound thereon is rotatably housed within said cartridge case. The tape leader pin is firmly attached to the leading end of said magnetic tape and is detachably held near the tape leader opening by a spring member. The surface hardness of the sliding surface of the spring member with respect to said tape leader pin is made higher than that of the tape leader pin to prevent an increase in the sliding resistance between the sliding surface of the tape leader pin and the sliding surface of a leader-pin holding spring.

8 Claims, 3 Drawing Sheets

MAGNETIC TAPE CARTRIDGE

BACKGROUND OF THE INVENTION

1. Field of the Invention

The present invention relates to a magnetic tape cartridge, in which a single tape reel with magnetic tape wound thereon is rotatably housed within a cartridge case, and in which a tape leader pin for pulling the magnetic tape out of the cartridge case is firmly attached to the leading end of the magnetic tape.

2. Description of the Related Art

In magnetic tape cartridges, which are being used as storage media that are employed in external storage units for computers, etc., there is known a type where a single tape reel with magnetic tape wound thereon is rotatably housed within a cartridge case. This magnetic tape is employed to archive data for computers, etc. Since important information has been stored, the magnetic cartridge is constructed so that problems, such as tape jamming, etc., do not occur and that the magnetic tape is not pulled out of the cartridge case inadvertently.

The magnetic tape has an elongate tape leader pin firmly attached to the leading end thereof. When this magnetic tape cartridge is loaded into a recording-reproducing unit, a leader-pin catching member on the side of the recording-reproducing unit engages the tape leader pin and pulls out the magnetic tape from the cartridge case. On the other hand, when the magnetic tape cartridge is unloaded from the recording-reproducing unit, the magnetic tape is rewound on the tape reel and the tape leader pin is returned into the cartridge case by the leader-pin catching member. The cartridge case is formed by fastening upper and lower cases of synthetic resin together with a plurality of small screws. Near a tape leader opening formed in the cartridge case, the tape leader pin is detachably held at the upper and lower ends thereof by a spring member.

The spring member for detachably holding the tape leader pin, incidentally, repeats sliding action each time the magnetic tape cartridge is loaded into or unloaded from the recording-reproducing unit. Because of this, the sliding surfaces of the tape leader pin and the spring member are worn away and the sliding resistance therebetween increases. As a result, the pulling-in-and-out of the tape leader pin through the tape leader opening cannot be smoothly performed. In the worst case, the pulling-in-and-out of the tape leader pin cannot be performed at all.

In addition, in the case that the spring member is formed from a plate spring, it is punched out from a plate, and consequently, burrs are liable to occur at the edge. If there are burrs on the sliding surface of the elastic arm portion of the spring member (plate spring) that contacts the tape leader pin, when the sliding surface of the elastic arm portion abuts the tape leader pin to hold the tape leader pin, the burrs cause scoring of the tape leader pin surface every time sliding action is performed between the elastic arm portion and the tape leader pin (i.e., when the magnetic tape cartridge is loaded into or unloaded from the recording-reproducing unit). Because of this, the sliding resistance between the elastic arm portion and the tape leader pin is increased. Consequently, the pulling-in-and-out of the tape leader pin through the tape leader opening cannot be smoothly performed. In the worst case, there is a fear that the pulling-in-and-out of the tape leader pin cannot be performed at all.

SUMMARY OF THE INVENTION

The present invention has been made in view of the circumstances mentioned above. Accordingly, it is the primary object of the present invention to provide a magnetic tape cartridge that is capable of preventing an increase in the sliding resistance between the sliding surface of a tape leader pin and the sliding surface of a spring member for holding the tape leader pin.

To achieve this end, there is provided a first magnetic tape cartridge comprising:

a cartridge case with a tape leader opening in a side wall;

a single tape reel having magnetic tape wound thereon and rotatably housed within the cartridge case; and a tape leader pin, firmly attached to a leading end of the magnetic tape, and detachably held near the tape leader opening by a spring member;

wherein a surface hardness of a sliding surface of the spring member with respect to the tape leader pin is higher than that of the tape leader pin.

It is preferable that the difference in hardness between the sliding surfaces of the tape leader pin and the spring member is made greater, as wear on the sliding surface of the spring member is reduced thereby. For example, the tape leader pin is formed from relatively soft metal material such as aluminum, or thermoplastic resin such as polycarbonate resin. The sliding surface of the spring member with respect to the tape leader pin is electroplated with chromium or nickel so that it has a surface hardness $H_V$ of 500 to 700. In this manner, the present invention is capable of preventing an increase in the sliding resistance between the sliding surfaces of the tape leader pin and the spring member.

According to the first magnetic tape cartridge of the present invention, the surface hardness of the sliding surface of the spring member with respect to the tape leader pin is higher than that of the tape leader pin. Because of this, the surface of the spring member is not worn away, and only the tape leader pin is worn away. Since the tape leader pin can be easily exchanged for a new one, the state of the sliding surfaces of the spring member and the tape leader pin can always be ideally maintained.

In a second magnetic tape cartridge of the present invention, at least either a sliding surface of the spring member or a sliding surface of the tape leader pin is subjected to a surface roughening process.

The surface roughening process can be performed by barreling. With the surface roughening process, the sliding surface has fine unevenness that is called a grain or dimple. It is preferable that the surface roughness be in a range of 0.5 to 3.0 $\mu$m in terms of 10-point mean roughness.

According to the second magnetic tape cartridge of the present invention, at least either a sliding surface of the spring member or a sliding surface of the tape leader pin is roughened. Because the sliding resistance between the two sliding surface is reduced, wear on the sliding surface of the spring member and/or the sliding surface of the tape leader pin is prevented. Thus, the state of the sliding surfaces of the spring member and the tape leader pin can be ideally maintained.

In a third magnetic tape cartridge of the present invention, the spring member consists of a plate spring, and at least a sliding surface of the plate spring with respect to the tape leader pin is subjected to a surface striking process.

According to the third magnetic tape cartridge of the present invention, the sliding surface of the plate spring with respect to the tape leader pin is subjected to the surface striking process. Since there are no burrs due to punching, there is no fear that the surface of the tape leader pin will be scored by burrs due to punching. Thus, third magnetic tape cartridge of the present invention is capable of preventing an increase in the sliding resistance between the sliding surface of the tape leader pin and the sliding surface of the plate spring.

BRIEF DESCRIPTION OF THE DRAWINGS

The present invention will be described in further detail with reference to the accompanying drawings wherein.

DESCRIPTION OF THE PREFERRED EMBODIMENTS

An embodiment of the present invention will hereinafter be described in detail with reference to the drawings. Note that a fore-and-aft direction in this embodiment corresponds to a direction in which a magnetic tape cartridge is loaded into a magnetic recording-reproducing unit (i.e., the direction diagonal to the upper right of FIG. 1 or the right direction in FIG. 3).

Figure 1:
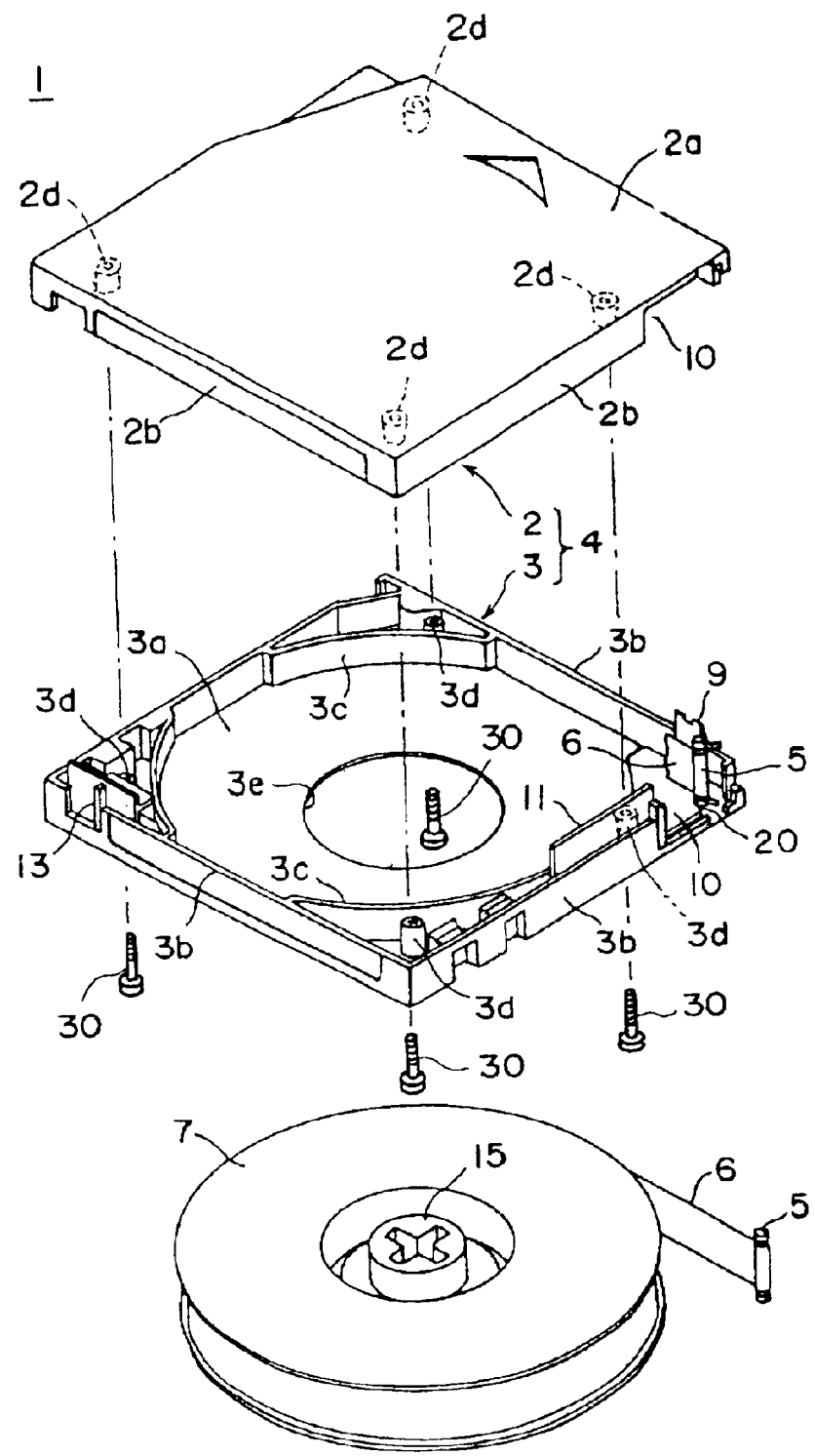
FIG. 1 is an exploded perspective view showing a magnetic tape cartridge constructed according to the present invention.

In FIG. 1, the magnetic tape cartridge 1 has a cartridge case 4, which is formed by fastening an upper case 2 and a lower case 3 together with four small screws 30. A tape leader pin 5 is firmly attached to the leading end of magnetic tape 6, and a single tape reel 7 with the magnetic tape 6 wound thereon is rotatably housed within the cartridge case 4. The upper and lower cases 2, 3 are approximately rectangular in shape, and are provided with top and bottom walls 2a, 3a, and upper and lower side walls 2b, 3b, along the perimeters of the top and bottom walls 2a, 3a. The upper and lower cases 2, 3 are further provided with arcuate inside walls 3c (not shown for the upper case 2) extending along the outer periphery of the tape reel 7. The four boss portions 3d of the lower case 3, each disposed between the side wall 3b and the inside wall 3c, are aligned vertically with the four boss portions 2d of the upper case 2, and the upper and lower cases 2, 3 are fastened together by the small screws 30 inserted through the bottom surface of the lower case 3.

The lower case 3 has a center aperture 3e at the central portion thereof so that the tape reel 7 is rotated by the driving shaft of a cartridge drive unit (not shown). The cartridge case 4 has a slidable write protect member 13 at the rear end portion thereof to inhibit writing onto the magnetic tape. The central portion of the tape reel 7 is provided with a locking mechanism 15 for restricting rotation of the tape reel 7 when it is not being used.

Although not shown, the tape reel 7 has a reel plate mounted on the central portion of the bottom surface thereof, the reel plate being used to attract and hold the magnetic rotation drive means of the cartridge drive unit. The radially outer portion of the bottom wall of the tape reel 7 is provided with a reel gear (not shown) which meshes with the driving gear of the rotation drive means. Note that if the reel gear and the driving gear mesh with each other, the locking mechanism 15 is unlocked so that the tape reel 7 is free to rotate.

The side walls 2b, 3b of the upper and lower cases 2, 3 are provided with a tape leader opening 10 through which the tape leader pin 5 of the magnetic tape 6 is pulled in and out of the cartridge case 4. The tape leader opening 10 is opened or closed by a slide door 11 urged in a closing direction by a spring (not shown). Near the tape leader opening 10, there is formed a grooved door rail 12 (see FIG. 3) along which the slide door 11 slides.

Figure 3:
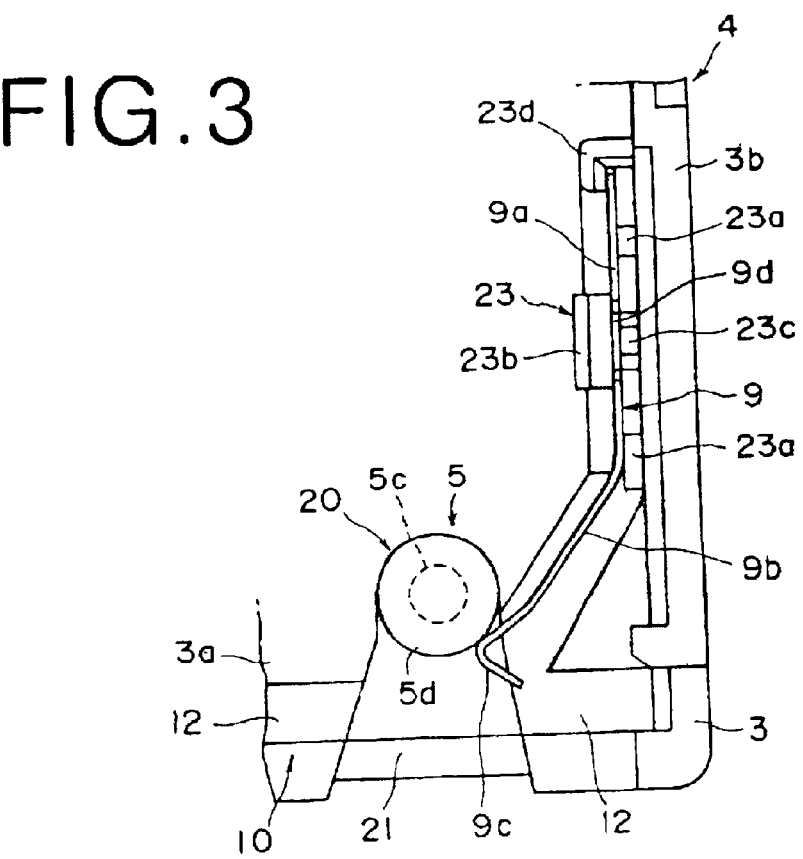
FIG. 3 is a plan view of the vicinity of the tape leader opening shown in FIG. 1, with the upper case removed to show how a tape leader pin is held by a leader-pin holding spring.

In the magnetic tape cartridge 1, as shown in FIG. 3, the tape leader pin 5 is locked and held in upper and lower leader-pin housing recesses 20, 20 formed near the tape leader opening 10, with the magnetic tape 6 completely wound on the tape reel 7 during non-use of the cartridge 1. The upper and lower leader-pin housing recesses 20, 20 are continuous to upper and lower insertion-guide portions 21, 21 (guide surfaces) formed into a lead-in structure toward the tape leader opening 10. That is, the upper and lower insertion-guide portions 21, 21 are constructed so that the upper and lower end portions of the tape leader pin 5 can be guided to the interior upper and lower leader-pin housing recesses 20, 20.

The tape leader pin 5 is pulled out of the cartridge case 4 through the tape leader opening 10 by a leader-pin catching member (not shown) provided in the drive mechanism of a recording-reproducing unit, in order to introduce the magnetic tape 6 into a tape traveling path formed within the recording-reproducing unit.

Figure 2:
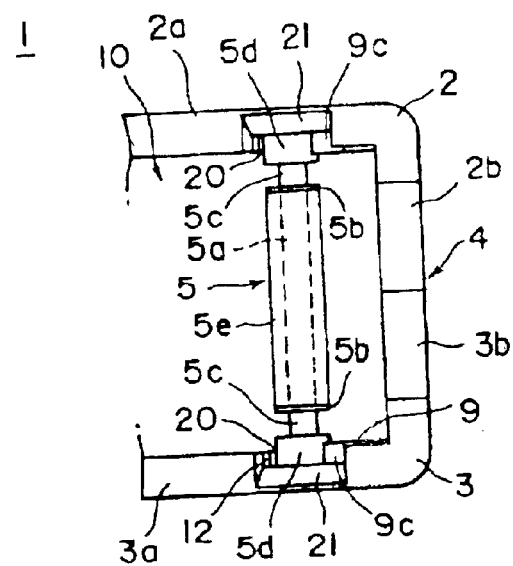
FIG. 2 is a front view of the vicinity of the tape leader opening shown in FIG. 1, a slide door being opened to show the tape leader opening.

The tape leader pin 5 consists of a pin main body of metal and a clamp member 5e of synthetic resin. As shown in FIG. 2, the pin main body is constructed of a core shaft portion 5a (indicated by a dashed line) to which the leading end of the magnetic tape 6 is clamped; thin flange portions 5b, 5b formed at the upper and lower ends of the core shaft portion 5a; engagement shaft portions 5c, 5c formed outside the thin flange portions 5b, 5b as portions that are engaged by the leader-pin catching member; and thick flange portions 5d, 5d formed outside the engagement shaft portions 5c, 5c. The clamp member 5e has a C-shaped cross section (having a slit) and is fitted elastically onto the outer periphery of the core shaft portion 5a. As a result, the leading end of the magnetic tape 6 is clamped (or firmly attached) between the core shaft portion 5a and the clamp member 5e.

Figure 4:
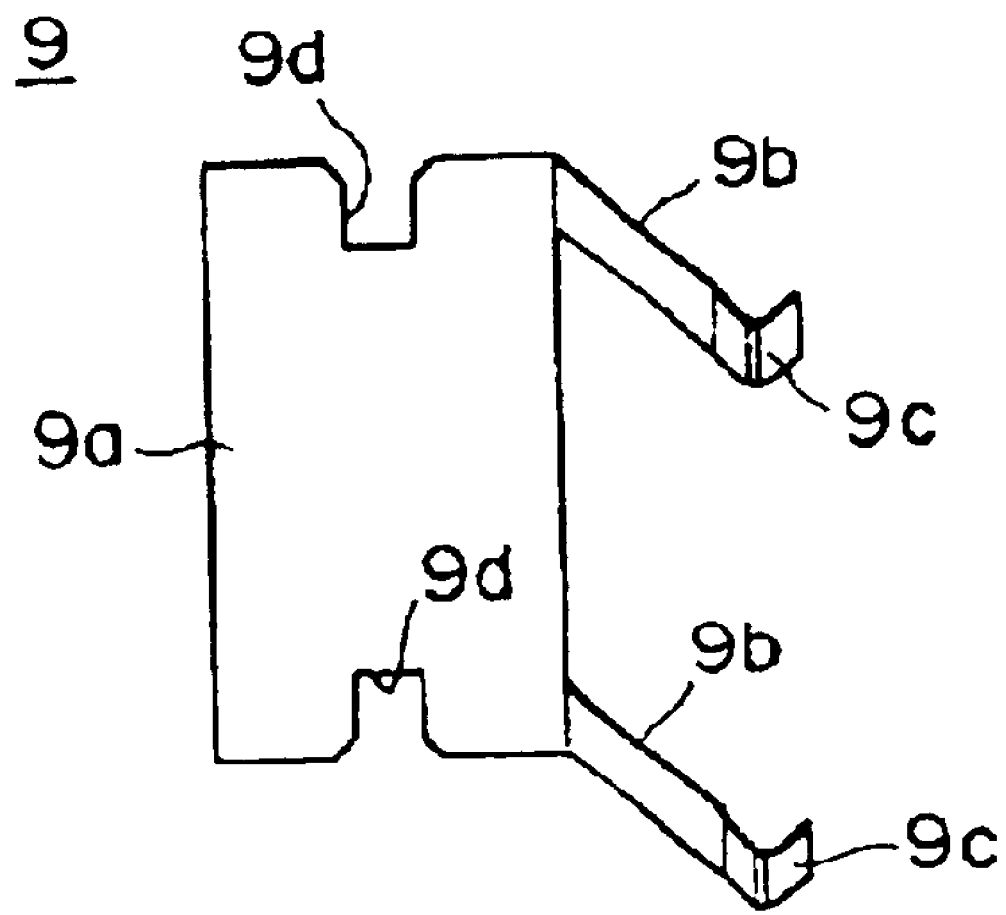
FIG. 4 is a perspective view of the leader-pin holding spring shown in FIG. 3.

The upper and lower cases 2, 3 are provided with a leader-pin holding spring 9, which consists of a plate spring such as that shown in FIG. 4, to detachably hold the upper and lower end portions of the tape leader pin 5 in the upper and lower leader-pin housing recesses 20, 20. The upper and lower portions of the leader-pin holding spring 9 are formed integrally. The leader-pin holding spring has a mounting portion 9a in the form of a generally rectangular plate. With the upper case 2 and the lower case 3 stacked on each other, the mounting portion 9a is engaged and held by upper and lower spring installing portions 23 provided near the case side walls (front walls) 2b, 3b, as shown in FIG. 3. Although not shown, the upper case 2 is symmetrical in shape with the lower case 3. The leader-pin holding spring 9 also has a pair of elastic arm portions 9b, 9b extending obliquely from the upper and lower end portions of the mounting portion 9a toward the tape leader pin 5. The elastic arm portions 9b, 9b have leader-pin holding portions 9c, 9c at their outer ends, respectively. The leader-pin holding portions 9c, 9c elastically abut the outer peripheries of the upper and lower flange portions 5d, 5d of the tape leader pin 5. As shown in FIG. 3, each leader-pin holding portion 9c is bent so that it projects toward the tape leader pin 5. The bent portion of the leader-pin holding portion 9c consists of an outer inclined surface and an inner inclined surface. If the tape leader pin 5 is inserted through the tape leader opening 10, the upper and lower flange portions 5d, 5d of the tape leader pin 5 are brought into contact with the outer inclined surfaces of the bent portions of the upper and lower leader-pin holding portions 9c, and the upper and lower elastic arm portions 9b, 9b are elastically deformed. As a result, the upper and lower flange portions 5d, 5d of the tape leader pin 5 are held within the upper and lower leader-pin housing recesses 20, 20 by the inner inclined surfaces of the bent portions of the upper and lower lead-pin holding portions 9c of the leader-pin holding spring 9. In addition, the top and bottom edges of the mounting portion 9a are provided with engagement recesses 9d, 9d, respectively.

The lower spring installing portion 23 of the lower case 3, for holding the leader-pin holding spring 9, is equipped with two ribs 23a and 23a formed on the interior surface of the side or front wall 3b of the lower case 3; a first protrusion 23b erected in the top surface of the lower case 3; a second protrusion 23c formed between the two ribs 23a and 23a. Similarly, the upper spring installing portion (not shown) of the upper case 2 is equipped with two ribs (not shown), a first protrusion (not shown), and a second protrusion (not shown). If the upper and lower portions of the mounting portion 9a of the leader-pin holding spring 9 are inserted between the upper ribs and the upper first protrusion and between the lower ribs 23a and the lower first protrusion 23b, the upper and low second protrusions 23c are fitted into the upper and lower engagement recesses 9d, 9d of the mounting portion 9a of the leader-pin holding spring 9. In this manner, the leader-pin holding spring 9 is held by the upper and lower spring installing portions 23. Furthermore, the spring installing portions 23 are provided with tilt regulating portions 23d, which are used to hold the edge, opposite to the elastic arm portions 9b, of the mounting portion 9a of the leader-pin holding spring 9 in an upright state.

In the first embodiment of the present invention described above, the leader-pin holding spring 9 with elastic arm portions 9b, 9b is formed from Steel Use Stainless (SUS) material (e.g., SUS304), and the surface hardness $H_V$ of the leader-pin holding portions 9c, 9c is increased to about 500 to 700 by chromium plating or nickel plating. On the other hand, the pin main body of the tape leader pin 5, equipped with the flange portions 5d, 5d, is formed from aluminum, and the surface hardness $H_V$ is about 50 to 200. With this hardness difference between the tape leader pin 5 and the leader-pin holding spring 9, wear on the sliding surfaces of the leader-pin holding spring 9, which contact with the flange portions 5d, 5d of the tape leader pin 5, is prevented.

Thus, in the case where the surface hardness of the outer end portions of the elastic arm portions 9b, 9b of the leader-pin holding spring 9 is higher by far than that of the flange portions 5d, 5d of the tape leader pin 5, the outer end portions of the elastic arm portions 9b, 9b of the leader-pin holding spring 9 are not worn away and only the outer peripheral surfaces of the flange portions of the tape leader pin 5 are worn away, when the magnetic tape cartridge 1 repeats loading and unloading operations for a long period of time. Therefore, if a worn-away tape leader pin is exchanged for a new one, the sliding resistance between the sliding surfaces of the tape leader pin 5 and the leader-pin holding spring 9 can be prevented from being increased to greater than a predetermined amount.

In a second embodiment of the present invention, the sliding surfaces of the leader-pin holding portions 9c, 9c of a leading-pin holding spring 9 that contact with the tape leader pin 5 are roughened, for example, by barreling. It is preferable that the surface roughness of the sliding surfaces be in a range of 0.5 to 3.0 $\mu$m in terms of 10-point mean roughness. Note that roughening of the sliding surface may be performed not on the leader-pin holding spring 9 but on the tape leader pin 5, or may be performed on both the leader-pin holding spring 9 and the tape leader pin 5.

Thus, the sliding resistance between the sliding surfaces can be reduced by roughening at least either the sliding surface of the leader-pin holding spring 9 or the sliding surface of the tape leader pin 5. Since wear on the leader-pin holding spring 9 and/or the tape leader pin 5 is prevented, the state of the sliding surfaces of the leader-pin holding spring 9 and the tape leader pin 5 can be ideally maintained.

Furthermore, in a third embodiment of the present invention, burrs due to punching are removed by performing a surface striking process on at least the sliding surfaces of the elastic arm portions 9b, 9b of the leader-pin holding spring 9.

Thus, in the third embodiment of the present invention, a surface striking process is performed on at least the sliding surfaces of the elastic arm portions 9b, 9b of the leader-pin holding spring 9, so there is no fear that the surface of the tape leader pin 5 will be scored by burrs due to punching. Thus, the third embodiment is capable of preventing an increase in the sliding resistance between the sliding surfaces of the leader-pin holding spring 9 and the tape leader pin 5.

While the present invention has been described with reference to the preferred embodiments thereof, the invention is not to be limited to the details given herein, but may be modified within the scope of the invention hereinafter claimed.

What is claimed is:

1. A magnetic tape cartridge comprising:
   a cartridge case with a tape leader opening in a side wall;
   a single tape reel having magnetic tape wound thereon rotatably housed within said cartridge case; and
   a tape leader pin, firmly attached to a leading end of said magnetic tape, and detachably held near said tape leader opening by a spring member;
   wherein a surface hardness of a sliding surface of said spring member with respect to said tape leader pin is higher than that of said tape leader pin;
   wherein said tape leader pin and said spring member are both formed of a same type of material, where the type of material is a metal.

2. A magnetic tape cartridge comprising:
   a cartridge case with a tape leader opening in a side wall;
   a single tape reel having magnetic tape wound thereon rotatably housed within said cartridge case; and
   a tape leader pin, firmly attached to a leading end of said magnetic tape, and detachably held near said tape leader opening by a spring member;

wherein a surface hardness of a sliding surface of said spring member with respect to said tape leader pin is higher than that of said tape leader pin, wherein said spring member is formed from stainless steel and said sliding surface of said spring member is plated with chromium or nickel.

3. The magnetic tape cartridge as set forth in claim 2, wherein said sliding surface has a surface hardness Hv of 500 to 700.

4. The magnetic tape cartridge as set forth in claim 2, wherein said tape leader pin is formed from relatively soft metal material.

5. The magnetic tape cartridge as set forth in claim 4, wherein said relatively soft metal material is aluminum.

6. The magnetic tape cartridge as set forth in claim 5, wherein said tape leader pin has a surface hardness $H_v$ of 50 to 200.

7. The magnetic tape cartridge as set forth in claim 2, wherein said tape leader pin is formed from synthetic resin.

8. The magnetic tape cartridge as set forth in claim 7, wherein said synthetic resin comprises polycarbonate resin.

* * * * *